(12) United States Patent
Yu et al.

(10) Patent No.: US 6,652,691 B1
(45) Date of Patent: Nov. 25, 2003

(54) SEAM STRESS RELEASE AND PROTRUSION ELIMINATION PROCESS

(75) Inventors: Robert C. U. Yu, Webster, NY (US); Satchidanand Mishra, Webster, NY (US); Richard L. Post, Penfield, NY (US); Anthony M. Horgan, Pittsford, NY (US); Bing R. Hsieh, Webster, NY (US); Edward F. Grabowski, Webster, NY (US); Donald C. VonHoene, Fairport, NY (US); Stephen T. Avery, Rochester, NY (US); Scott J. Griffin, Fairport, NY (US); Edward A. Domm, Hilton, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/428,932

(22) Filed: Oct. 28, 1999

(51) Int. Cl.[7] .................. B29C 65/14; B29C 65/16; B29C 65/18

(52) U.S. Cl. ................ 156/137; 156/272.2; 156/272.8; 156/275.1; 156/304.6; 156/308.4; 264/345

(58) Field of Search .................. 156/137, 203, 156/218, 275.1, 272.8, 304.1, 304.6, 308.4; 264/345

(56) References Cited

U.S. PATENT DOCUMENTS

| | | | | |
|---|---|---|---|---|
| 3,969,173 A | * | 7/1976 | Amberg et al. | 156/218 |
| 3,988,399 A | | 10/1976 | Evans | 264/22 |
| 4,035,211 A | * | 7/1977 | Bill et al. | 156/54 |
| 4,532,166 A | | 7/1985 | Thomsen et al. | 428/57 |
| 4,840,873 A | | 6/1989 | Kobayashi et al. | 430/273 |
| 5,021,109 A | | 6/1991 | Petropoulos et al. | 156/137 |
| 5,240,532 A | | 8/1993 | Yu | 156/137 |
| 5,376,491 A | | 12/1994 | Krumberg et al. | 430/136 |
| 5,603,790 A | | 2/1997 | Rhodes | 156/137 |
| 6,074,504 A | * | 6/2000 | Yu et al. | 156/137 |

* cited by examiner

Primary Examiner—Sam Chuan Yao
(74) Attorney, Agent, or Firm—Robert Thompson

(57) ABSTRACT

A process for providing an improved imaging member belt having a welded seam which exhibits greater resistance to dynamic fatigue induced seam cracking and delamination. An apparatus for achieving stress relaxation and eliminating protrusions in the seam region is also disclosed.

16 Claims, 8 Drawing Sheets

SEAM STRESS RELEASE AND PROTRUSION ELIMINATION PROCESS

BACKGROUND OF THE INVENTION

This invention relates in general to a seam treatment process and, more specifically, to a stress release and protrusions elimination process for seams of flexible belts.

Flexible electrostatographic belt imaging members are well known in the art. Typical electrostatographic flexible belt imaging members include, for example, photoreceptors for electrophotographic imaging systems, electroreceptors such as ionographic imaging members for electrographic imaging systems, and intermediate transfer belts for transferring toner images in electrophotographic and electrographic imaging systems. These belts are usually formed by cutting a rectangular sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The "imaging layer" as employed herein is defined as the dielectric imaging layer of an electroreceptor belt, the transfer layer of an intermediate transfer belt and, the charge transport layer of an electrophotographic belt. Thus, the thermoplastic polymeric matrix material in the imaging layer is located in the upper portion of a cross section of an electrostatographic imaging member belt, the substrate layer being in the lower portion of the cross section of the electrostatographic imaging member belt. Although the flexible belts of interest consist of these mentioned types, nonetheless for simplicity reason, the discussion hereinafter will be focused only on the electrophotographic imaging member belts.

Flexible electrophotographic imaging member belts are usually multilayered photoreceptors that comprise a substrate, an electrically conductive layer, an optional hole blocking layer, an adhesive layer, a charge generating layer, and a charge transport layer and, in some embodiments, an anti-curl backing layer. One type of multilayered photoreceptor comprises a layer of finely divided particles of a photoconductive inorganic compound dispersed in an electrically insulating organic resin binder. A typical layered photoreceptor having separate charge generating (photogenerating) and charge transport layers is described in U.S. Pat. No. 4,265,990, the entire disclosure thereof being incorporated herein by reference. The charge generating layer is capable of photogenerating holes and injecting the photogenerated holes into the charge transport layer.

Although excellent toner images may be obtained with multilayered belt photoreceptors, it has been found that as more advanced, higher speed electrophotographic copiers, duplicators and printers were developed, fatigue induced cracking of the charge transport layer at the welded seam area is frequently encountered during photoreceptor belt cycling. Moreover, the onset of seam cracking has also been found to rapidly lead to seam delamination due to fatigue thereby shortening belt service life. Dynamic fatigue seam cracking and delamination also occurs in ionographic imaging member belts and may possibly happen in intermediate transfer belts as well.

The flexible electrophotographic imaging member belts are fabricated from sheets cut from a web. The sheets are generally rectangular in shape. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. Ultrasonic welding is generally the preferred method of joining because is rapid, clean (no solvents) and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible sheet with vacuum over a flat anvil and guiding the flat end of an ultrasonic vibrating horn transversely across the width of the sheet and along the length of the overlapped ends to form a welded seam.

When ultrasonically welded into a belt, the seam of multilayered imaging flexible members may occasionally contain undesirable high protrusions such as peaks, ridges and mounds. These seam protrusions present problems during image cycling of the belt machine because they interact with cleaning blades to cause blade wear and tear which ultimately affect cleaning blade life and efficiency. Moreover, the high protrusions in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt photoreceptor. Another frequently observed mechanical failure in imaging belts during image cycling is that the ultrasonically welded seam of an electrophotographic imaging member belt can also develop cracks which then propagate into delamination after being subjected to extended fatigue bending and flexing cycles over small diameter belt support rollers of an imaging machine or when due to lateral forces caused by mechanical rubbing contact with stationary web edge guides of a belt support module during cycling. Seam cracking/delamination has also been found to be further aggravated when the belt is employed in electrophotographic imaging systems utilizing blade cleaning devices. Alteration of materials in the various photoreceptor belt layers such as the conductive layer, hole blocking layer, adhesive layer, charge generating layer, and/or charge transport layer to suppress cracking and delamination problems is not easily accomplished. The alteration of the materials may adversely affect the overall electrical, mechanical and other properties of the belt such as well as residual voltage, background, dark decay, flexibility, and the like.

For example, when a flexible imaging member belt used in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The ultrasonic welded seam of a multilayered photoreceptor belt is relatively brittle and low in strength and toughness. The joining techniques, particularly the welding process, can result in the formation of a splashing that projects out from either side of the seam in the overlap region of the belt. The overlap region and the spashings on each side of the overlap region comprise a strip from one edge of the belt to the other that is referred herein as the "seam region". Because of the splashing, a typical flexible imaging member belt is about 1.6 times thicker in the seam region than that of the remainder of the belt (e.g., in a typical example, 188 micrometers versus 1.6 micrometers).

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing may develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the point of crack initiation which is further developed into seam delamation causing premature mechanical failure in the belt. Thus, the splashing tends to shorten the mechanical life of the seam and service life of the flexible member belts used in copiers, duplicators, and printers.

Although a solution to suppress the seam cracking/delamination problem has been successfully demonstrated, as described in a prior art, by a specific heat treatment process of a flexible electrophotographic imaging member belt with its seam parked directly on top of a 19 mm diameter back support rod for stress-releasing treatment at a temperature slightly above the glass transition temperature (Tg) of the charge transport layer of the imaging member, nevertheless this seam stress release process was also found to produce various undesirable effects such as causing seam area imaging member set and development of belt ripples in the active electrophotographic imaging zones of the belt (e.g., the region beyond about 25.2 millimeters from either side from the midpoint of the seam). Moreover, the heat treatment can induce undesirable circumferential shrinkage of the imaging belt. The set in the seam area of an imaging member mechanically adversely interacts with the cleaning blade and impacts cleaning efficiency. The ripples in the imaging member belt manifest themselves as copy printout defects. Further, the heat induced imaging belt dimensional shrinkage alters the precise dimensional specifications required for the belt. Another key shortcoming associated with the prior art seam stress release heat treatment process is the extensive heat exposure of a large seam area. This extensive heat exposure heats both the seam area of the belt as well as the rod supporting the seam. Since the belt must be cooled to below the glass transition temperature of the thermoplastic material in the belt prior to removal from the support rod in order to produce the desired degree of seam stress release in each belt, the heat treatment and cooling cycle time is unduly long and leads to very high belt production costs.

Since there is no effective way to prevent the generation of localized high protrusions at the seam, imaging member belts are inspected, right after the seam welding belt production process, manually by hand wearing a cotton glove through passing the index finger over the entire seam length, and belts found catching the glove by the protrusion spots are identified as production rejects. Both the time consuming procedure of manual inspection and the number of seamed belts rejected due to the presence of high seam protrusions constitute a substantial financial burden on the production cost of imaging member belts.

Therefore, there is an urgent need for improving the physical quality and mechanical performance of seamed flexible imaging member belts having seams that are free of protrusions and which can withstand greater dynamic fatigue conditions to thereby extending belt service life. It is also important, from the imaging member belt production point of view, that effective cutting of unit manufacturing cost of a seamed imaging belts can be realized if an innovative post seaming treatment process can be developed to provide the dual function of effecting seam stress release and eliminating seam protrusions in a single process. With this innovative post seaming treatment process, the need for a manual seam inspection procedure is eliminated because the process can effectively remove seam protrusions from those imaging member belts that are otherwise lost as rejects.

INFORMATION DISCLOSURE STATEMENT

U.S. Pat. No. 5,240,532, issued to Yu on Aug. 31, 1993—A process for treating a flexible electrostatographic imaging web is disclosed including providing a flexible base layer and a layer including a thermoplastic polymer matrix comprising forming at least a segment of the web into an arc having a radius of curvature between about 10 millimeters and about 25 millimeters measured along the inwardly facing exposed surface of the base layer, the arc having an imaginary axis which traversed the width of the web, heating at least the polymer matrix in the segment to at least the glass transition temperature of the polymer matrix, and cooling the imaging member to a temperature below the glass transition temperature of the polymer matrix while maintaining the segment of the web in the shape of the arc.

U.S. Pat. No. 5,552,005 to Mammino et al., issued Sep. 3, 1996—A flexible imaging sheet and a method of constructing a flexible imaging sheet is disclosed. The method of constructing a flexible imaging sheet comprises a step of overlapping, a step of joining, and a step of shaping. In the step of overlapping, a first marginal end region and a second marginal end region of a sheet are overlapped to form an overlap region and a ex non-overlap region. In the step of joining, the first marginal end region and the second marginal end region of the sheet are joined to one another by a seam in the overlap region. In the step of shaping, the overlap region is shaped to form a generally planar surface co-planar with a surface of the non-overlap region. The flexible imaging sheet comprises a first marginal end region and a second marginal end region. The first marginal end region and the second marginal end region are secured by a seam to one another in the overlap region. The first marginal end region and the second marginal end region are substantially co-planar to minimize stress on the flexible imaging sheet. Minimization of stress concentration, resulting from dynamic bending of the flexible imaging sheet during cycling over a roller within an electrophotographic imaging apparatus, is particularly accomplished in the present invention.

U.S. Pat. No. 5,376,491 to Krumberg et al., issued Dec. 27, 1994—An organic photoconductor is disclosed including a base layer formed of a first material and a photoconductive layer formed of a second material. The organic photoconductor being characterized in that when it is maintained in a curved orientation with the photoconductive layer facing outward, the photoconductive layer is subjected to less stress than the base layer. In one embodiment the first material is relatively more flexible and stretchable than said second material and the materials are pre-stressed in opposite senses. In a second embodiment the first material is relatively flexible and stretchable and the second material is an initially less flexible and stretchable material which has been chemically treated to increase its stretchability and flexibility.

U.S. Pat. No. 5,021,109 to Petropoulous et al., issued Jun. 4, 1991—A process is disclosed for preparing a multilayered belt comprising the steps of: (1) heating a substrate in a form of a tubular sleeve and formed of a polymeric material to at least about a glass transition temperature of the polymeric material, so as to expand the tubular sleeve; (2) placing the expanded tubular sleeve on a mandrel; (3) treating the tubular sleeve by applying one or more multilayered composite belts; (4) layers on the sleeve to form a heating composite belt to at least about the glass transition temperature of the polymeric material of the tubular sleeve; and (5) cooling the composite belt.

U.S. Pat. No. 5,603,790 to Rhodes, issued Feb. 18, 1997—Process and apparatus for fabricating belts are disclosed. The process includes conveying the leading edge of a flexible web from a supply roll past a slitting station, slitting the web a predetermined distance from the leading edge to form a web segment having the leading edge at one end and a trailing edge at the opposite end, maintaining the web slack at the location where the web is slit during slitting, overlapping the leading edge and the trailing edge of the web segment to form a joint and welding the joint to permanently join the leading edge and the trailing edge together to form a belt. The apparatus includes means to convey the leading edge of a flexible web from a supply roll past a slitting station, means at the slitting station to slit the web a predetermined distance from the leading edge to form a web segment having the leading edge at one end and a trailing edge at the opposite end, means to maintain the web slack at the location where the web is slit during slitting, means to overlap the leading edge and the trailing edge of the web segment to form a joint and means to weld the joint to permanently join the leading edge and the trailing edge together to form a belt.

U.S. Pat. No. 4,840,873 to Kobayashi et al., issued Jun. 20, 1989—A process is disclosed for producing an optical recording medium comprising the step of heat treating an optical recording medium comprising a plastic substrate having a surface of minutely roughened structure and a thin metal film formed on the surface. The optical recording medium is heated at a temperature within a range which is lower by 80° C. and higher by 60° C. than the glass transition temperature of the plastic substrate.

U.S. Pat. No. 4,532,166 to Thomsen et al., issued Jul. 30, 1985—A welded web is disclosed which is prepared by overlapping a first edge over a second edge, then applying heat necessary to bond the first edge with the second edge. The heating techniques may include ultrasonic welding, radio frequency heating, and the like.

U.S. Pat. No. 3,988,399 to Evans, issued Oct. 26, 1996—Heat recoverable articles are disclosed which have an elongate S-shaped configuration, which later can be wrapped about a substrate. The articles comprise a molecularly oriented unitary polymeric layer which has been differentially annealed while restrained against dimensional change and crosslinking.

CROSS REFERENCE TO RELATED APPLICATIONS

This application is related to the following U.S. patent applications:

U.S. patent application Ser. No. 09/004,651, filed on Jan. 8, 1998, in the name of Yu et al., entitled "DEFOCUSED LASER SEAM STRESS RELEASE IN FLEXIBLE ELECTROSTATOGRAPHIC IMAGING MEMBER BELTS", —A process is disclosed for treating a seamed flexible electrostatographic imaging belt including providing an imaging belt having two parallel edges, the belt comprising at least one layer comprising a thermoplastic polymer matrix and a seam extending from one edge of the belt to the other, the seam having an imaginary centerline, providing an elongated support member having at arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member, precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming spot straddling the seam during traverse, the spot having a width of between about 3 millimeters and about 25 millimeters measured in a direction perpendicular to the imaginary centerline of the seam, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member. The entire disclosure of this application is incorporated herein by reference.

U.S. patent application Ser. No. 09/004,289, filed on Jan. 8, 1998, in the names of Yu et al., entitled "SEAM STRESS RELEASE IN FLEXIBLE ELECTROSTATOGRAPHIC IMAGING BELTS"—A process for treating a seamed flexible electrostatographic imaging belt including providing an imaging belt including at least one layer including a thermoplastic polymer matrix and a seam extending from one edge of the belt to the other, providing an elongated support member having a arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member with a wrap angle at least sufficiently enough to provide arcuate support for the seam area, traversing the seam from one edge of the belt to the other with infrared rays from a tungsten halogen quartz bulb focused with a reflector having a hemiellipsoid shape to form a heated substantially circular spot straddling the seam during traverse, the spot having a diameter of between about 3 millimeters and about 25 millimeters, without exceeding the breadth of supported arcuate seam area, to substantially instantaneously heat the thermoplastic polymer matrix in the seam and the region of the belt adjacent each side of the seam directly under the heating spot to at least the glass transition temperature of the polymer matrix without significantly heating the support member, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member. Apparatus for carrying out this process is also disclosed.

U.S. patent application Ser. No. 09/004,290, filed on Jan. 8, 1998, in the names of Yu et al., entitled "RAPID ELECTROSTATOGRAPHIC BELT TREATMENT SYSTEM"—A process is disclosed for treating a seamed flexible electrostatographic imaging belt is disclosed including providing an imaging belt including at least one imaging layer including a thermoplastic polymer matrix and a seam extending from one edge of the belt to the other, the seam having a region on the belt adjacent each side of the seam and also having an exposed surface on each side of the belt, supporting the belt with at least one vacuum holding device spaced from the seam while maintaining the seam and region of the belt adjacent each side of the seam in an arcuate shape having at least a substantially semicircular cross section having a radius of curvature of between about 9.5 millimeters and about 50 millimeters, heating the thermoplastic polymer matrix of the imaging layer in the seam and the region of the belt adjacent each side of the seam to at least the glass transition temperature (Tg) of the thermoplastic polymer matrix without significantly heating the support member, and contacting the exposed surface of the seam and regions on each side of the belt with a gas to rapidly cool the seam and regions on each side of the belt to a temperature below the glass transition temperature of the polymer matrix while maintaining the arcuate shape of the region of the belt adjacent each side of the seam. Apparatus for carrying out this process is also disclosed. The entire disclosure of this application is incorporated herein by reference.

U.S. patent application Ser. No. 09/429,148, filed concurrently herewith, in the names of Yu et al., entitled "A FLEXIBLE IMAGING BELT SEAM SMOOTHING METHOD"—A process for post treatment of an ultrasonically welded seamed flexible imaging member belt including providing an elongated support member having a smooth flat supporting surface, providing a flexible belt having parallel edges and a welded seam extending from one edge to the other edge, the belt seam including a seam region including an overlap and two adjacent splashings, thermoplastic polymer material having a glass transition temperature and an inner and outer surface, supporting the inner surface of seam on the smooth flat supporting surface with the seam region of the belt held down by vacuum against and conforming to the flat supporting surface of the support member, contacting the seam with a heated surface, the contacting heated surface has a profile that is substantially parallel to the smooth flat supporting surface of the support member, heating the seam region with the heated surface to raise the temperature in the seam region to a temperature of from about 2° C. to 20° C. above the Tg of the thermoplastic polymer material, and compressing the seam with the heated surface with sufficient compression pressure to smooth out the seam. Apparatus for carrying out the process is also disclosed. The entire disclosure of this application is incorporated herein by reference.

Thus, there is a continuing need for electrostatographic imaging belts having improved resistance to seam cracking and delamination, free of seam protrusions, and free of factors that damage imaging subsystems.

SUMMARY OF THE INVENTION

It is, therefore, an object of the present invention to provide an improved electrostatographic imaging member belt which overcomes the above-noted deficiencies.

It is yet another object of the present invention to provide a mechanically robust seamed electrostatographic imaging member belt.

it is still another object of the present invention to provide an improved electrostatographic imaging member belt having an ultrasonically welded seam which exhibits greater resistance to dynamic fatigue induced seam cracking and delamination.

It is another object of the present invention to provide an improved electrostatographic imaging member belt having a welded seam which exhibits greater resistance to cracking and delamination and has no seam area set problem.

It is yet another object of the present invention to provide an improved electrostatographic imaging member belt having a mechanically robust welded seam and exhibiting good circumferential dimension tolerance.

It is also another object of the present invention to provide an improved electrostatographic imaging member belt having a welded seam which is free of induced belt ripples to create copy printout defects.

It is still another object of the present invention to provide a process that yields improved electrostatographic imaging member belts having a welded seam which is free of seam protrusions, exhibits greater resistance to fatigue induced cracking and delamination, has no seam area set, is free of belt ripple development, and maintains good belt dimensional tolerance.

It is still yet another object of the present invention to provide an improved electrostatographic imaging member belt with a stress free state in the imaging layer around the welded seam area when the electrostatographic imaging belt flexes over small diameter support rollers.

The foregoing objects and others are accomplished in accordance with this invention by providing a process comprising providing a support having an elongated surface with an arcuate convex substantially semicircular cross section having a predetermined radius of curvature, providing a flexible belt having parallel edges and a welded seam extending from one edge to the other edge, the belt seam comprising a seam region comprising an overlap and two adjacent splashings, polymer material having a glass transition temperature, an inner surface and an outer surface, supporting the inner surface of the seam on the elongated surface with the belt conforming to the predetermined radius of curvature, progressively elevating the temperature of localized sites along the seam from one edge of the belt to the other with heat energy to at least the glass transition temperature of the polymer material, applying line compressive contact against the seam region by pressing a rotatable wheel having a peripheral surface with an arcuate concave cross section having a radius of curvature which matches or is slightly larger than the predetermined curvature of the arcuate convex substantially semicircular cross section of the elongated surface, simultaneously rolling and pressing a part of the peripheral surface of the rotatable wheel against the outer surface of the seam to continuously generate lines of compressive contact over the seam region from one edge of the belt to the other while the temperature of the localized sites pressed by the wheel is at at least the glass transition temperature of the polymer material, the line of compressive contact at the peripheral surface of the wheel pressing against the outer surface of the seam being substantially parallel to the predetermined curvature of the elongated surface having an arcuate convex substantially semicircular cross section and in substantially line contact with the outer surface of the seam, and rapidly cooling the seam to a temperature below the glass transition temperature of the thermoplastic material while maintaining the belt in conformance with the predetermined arc.

This invention also includes apparatus for achieving stress relaxation and eliminating protrusions in the seam region.

Although this invention relates to apparatus and process improvements for electrostatographic imaging member belts, the following will focus only on electrophotographic imaging belts to simplify discussion.

A more complete understanding of the process and apparatus of the present invention can be obtained by reference to the accompanying drawings wherein:

BRIEF DESCRIPTION OF THE DRAWINGS

In the detailed description of a preferred embodiment of the present invention, reference is made to the accompanying drawings, in which.

Figure 1:
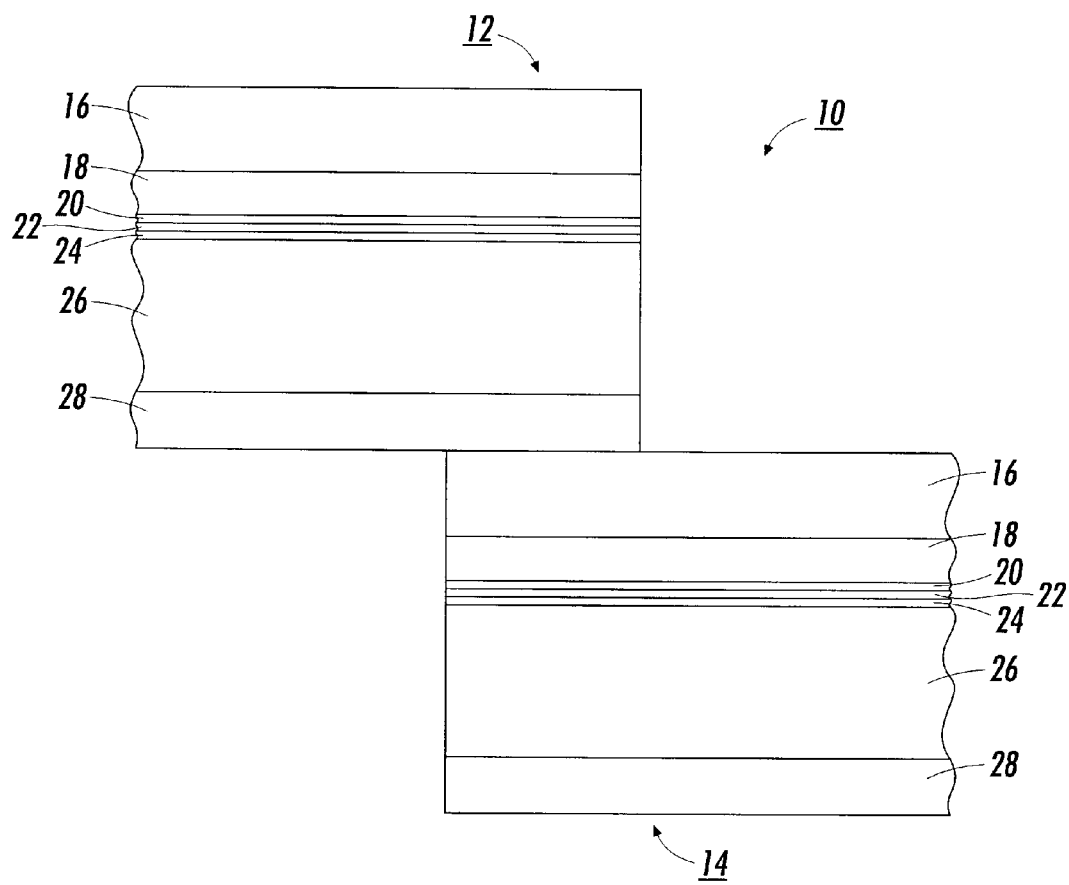
FIG. 1 illustrates a schematic partial cross-sectional view of a multiple layered flexible sheet of electrophotographic imaging material with opposite ends overlapped.

In the drawings and the following description, it is to be understood that like numeric designations refer to components of like function.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

Referring to FIG. 1, there is illustrated a flexible imaging member 10 in the form of a sheet having a first end marginal region 12 overlapping a second end marginal region 14 to form an overlap region ready for a seam forming operation. The flexible imaging member 10 can be utilized within an electrophotographic imaging member device and may be a single film substrate member or a member having a film substrate layer combined with one or more additional coating layers. At least one of the coating layers comprises a film forming binder.

The flexible imaging member 10 may be a single layer or comprise multiple layers. If the flexible imaging member 10 is to be a negatively charged photoreceptor device, the flexible imaging member 10 may comprise a charge generator layer sandwiched between a conductive surface and a charge transport layer. Alternatively, the flexible member 10 may comprise a charge transport layer sandwiched between a conductive surface and a charge generator layer.

The layers of the flexible imaging member 10 can comprise numerous suitable materials having suitable mechanical properties. Examples of typical layers are described in U.S. Pat. Nos. 4,786,570, 4,937,117 and 5,021,309, the entire disclosures thereof being incorporated herein by reference. The belt or flexible imaging member 10 shown in FIG. 1, including the two end marginal regions 12 and 14, comprises from top to bottom a charge transport layer 16, a generator layer 1, an interface layer 20, a blocking layer 22, a conductive ground plane layer 24, a supporting layer 26, and an anti-curl back coating layer 28. It should be understood that the thickness of the layers are conventional and that a wide range of thicknesses can be used for each of the layers.

Figure 2:
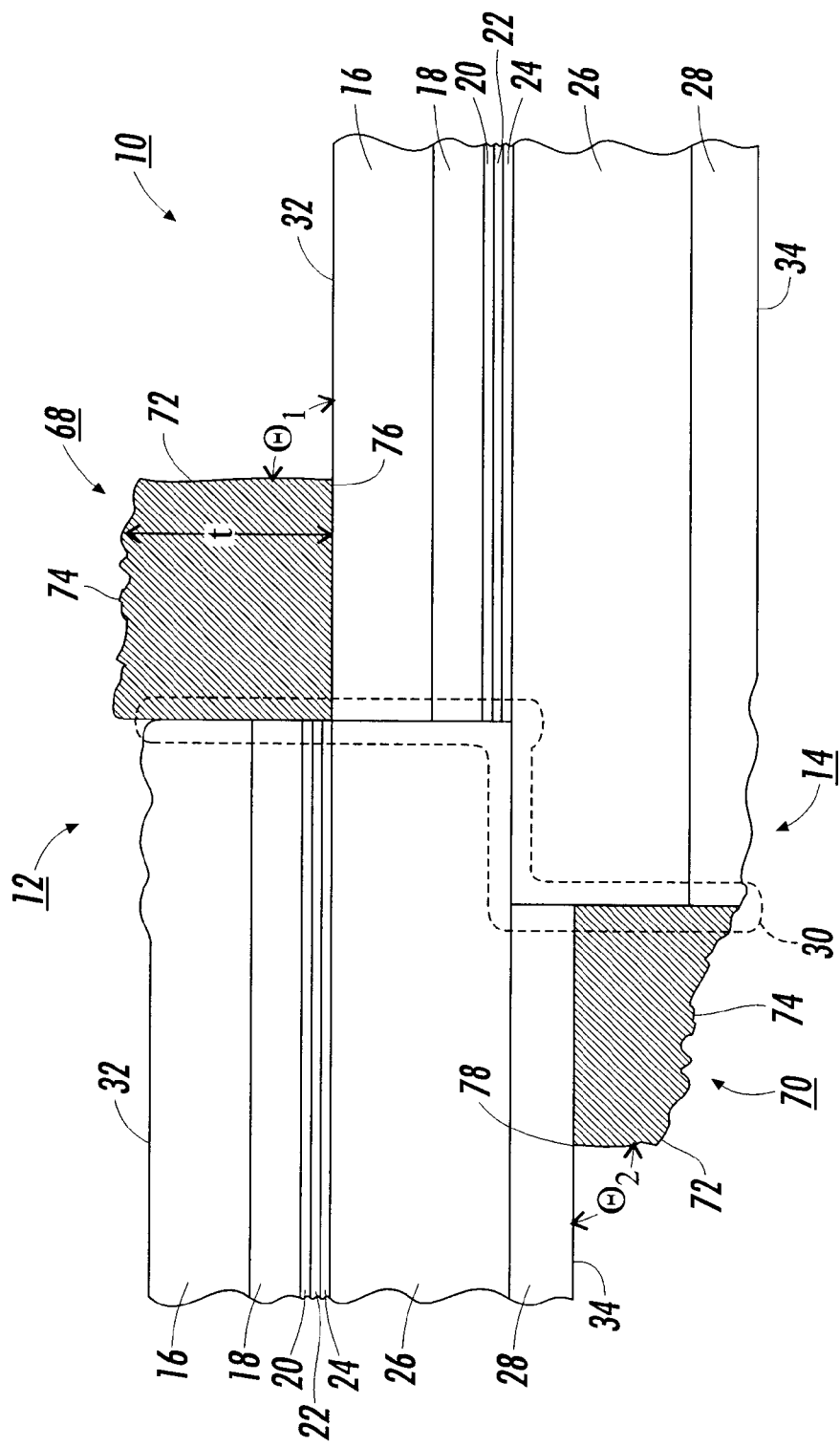
FIG. 2 shows a schematic partial cross-sectional view of a multiple layered seamed flexible electrophotographic imaging belt derived from the sheet illustrated in FIG. 1 after ultrasonic seam welding.

Although the end marginal regions 12 and 14 can be joined by any suitable means including ultrasonic welding, gluing, taping, stapling, and pressure and heat fusing to form a continuous imaging member seamed belt, sleeve, or cylinder, nevertheless, from the viewpoint of considerations such as ease of belt fabrication, short operation cycle time, and the mechanical strength of the fabricated joint, the ultrasonic welding process is preferably used to join the end marginal regions 12 and 14 of imaging member sheet 10 into a seam 30 in the overlap region, as illustrated in FIG. 2 to form a seamed flexible imaging member belt 10. As illustrated in FIG. 2, the location of seam 30 is indicated by a dotted line. Seam 30 comprises two vertical portions joined by a horizontal portion. Thus, the midpoint of seam 30 may be represented by an imaginary centerline extending the length of seam 30 from one edge to the opposite edge of belt 10, the imaginary centerline (not shown) running along the middle of the horizontal portion which joins the two vertical portions illustrated in FIG. 2. In other words, a plan view (not shown) of the horizontal portion of seam 30 would show a strip much like a two lane highway in which the centerline would be represented by the white divider line separating the two lanes, the two lanes comprising end marginal regions 12 and 14. The flexible imaging member 10 is thus transformed from a sheet of electrophotographic imaging member material as illustrated in FIG. 1 into a continuous electrophotographic imaging member belt 10 as illustrated in FIG. 2. The flexible imaging member belt 10 has a first major exterior surface or side 32 and a second major exterior surface or side 34 on the opposite side. The seam 30 joins the flexible imaging member 10 so that the bottom surface 34 (generally including at least one layer immediately above) at and/or near the first end marginal region 12 is integral with the top surface 32 (generally including at east one layer immediately below) at and/or near the second end marginal region 14.

When an ultrasonic welding process is employed to transform the sheet of flexible imaging member material into an imaging member belt, the seam of the belt is created by the high frequency mechanical pounding action of a welding horn over the overlapped opposite end regions of the imaging member sheet to cause material fusion. In the ultrasonic seam welding process, ultrasonic energy, generated by the welding horn action, in the form of heat is applied to the overlap region to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Figure 3:
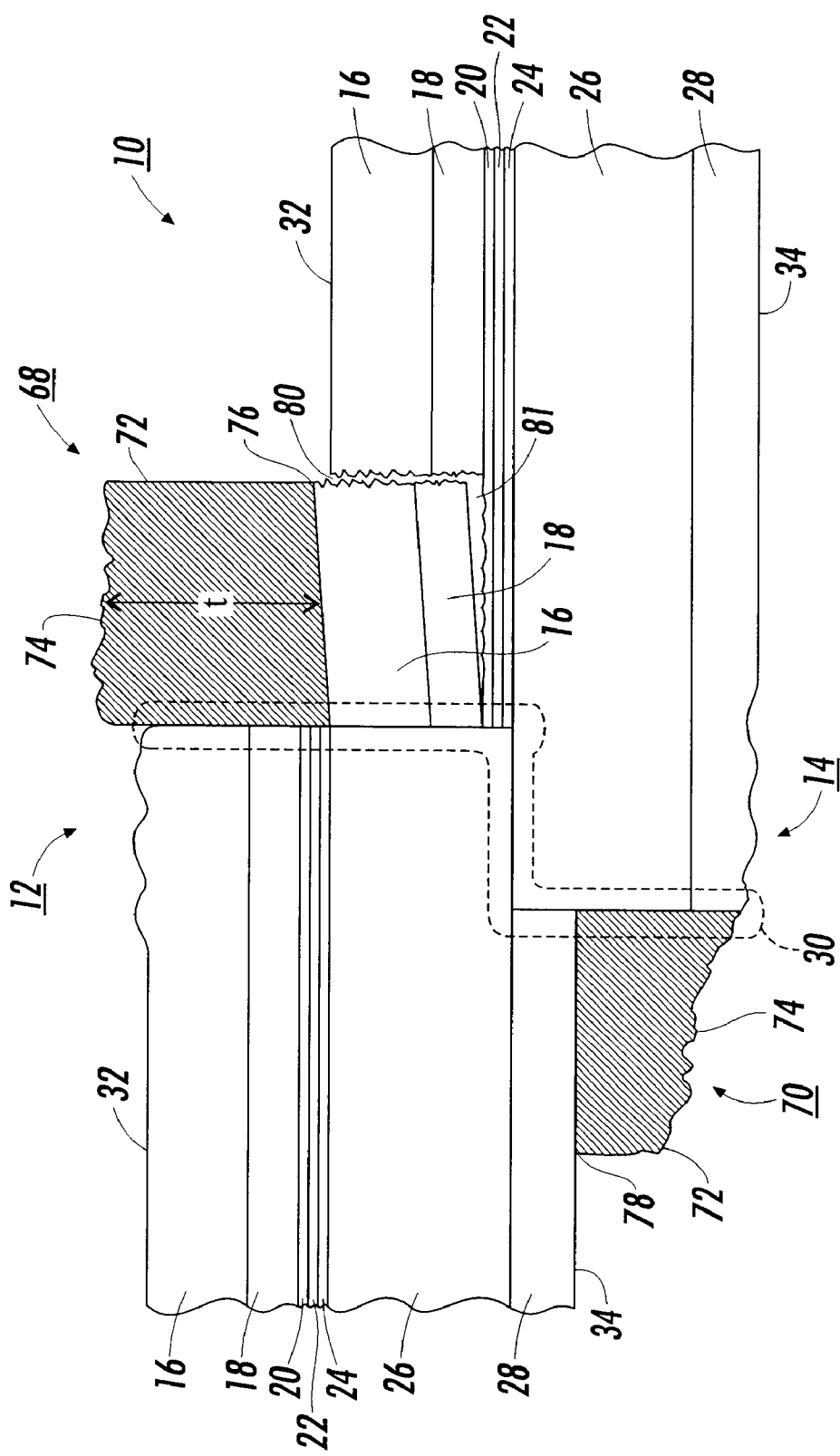
FIG. 3 illustrates a schematic partial cross-sectional view of a multiple layered seamed flexible electrophotographic imaging belt which has failed due to fatigue induced seam cracking and delamination.
Figure 4:
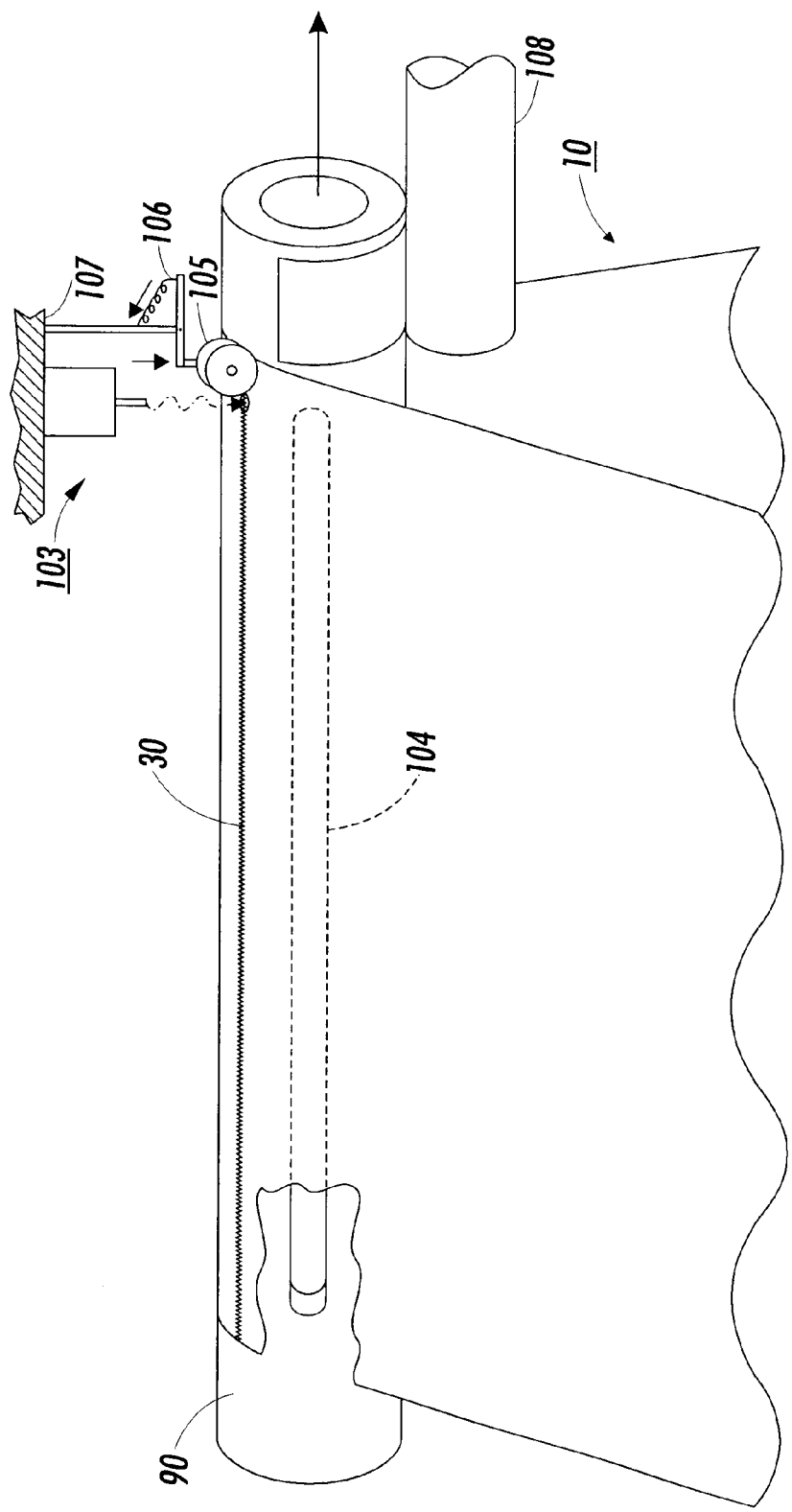
FIG. 4 shows an isometric schematic view of a seamed flexible electrophotographic imaging member belt in which the seam is parked on and held against the arcuate convex surface of an elongated support member by vacuum while subjected to a seam stress release and protrusions elimination process, utilizing a $CO_2$ laser heat energy beam source in combination with a rolling compression wheel.

Upon completion of welding of the overlap region of the imaging member sheet into a seam 30 using ultrasonic seam welding techniques, the overlap region is transformed into an overlapping and abutting region as illustrated in FIGS. 2 and 3. Within the overlapping and abutting region, the portions of the flexible member belt 10, which once formed the end marginal regions 12 and 14, are joined by the seam 30 such that the once end marginal regions 12 and 14 are overlapping and abutting one another. The welded seam 30 contains upper and lower splashings 68 and 70 at each end thereof as illustrated in FIGS. 2 and 4. The splashings 68 and 70 are formed in the process of joining the end marginal regions 12 and 14 together. Molten material is necessarily ejected from either side of the overlap region to facilitate direct support layer 26 of one end to support layer 26 of the other end fusing and results in the formation of the splashings 68 and 70. The upper splashing 68 is formed and positioned above the overlapping end marginal region 14 abutting the top surface 32 and adjacent to and abutting the overlapping end marginal region 12. The lower splashing 70 is formed and positioned below the overlapping end marginal region 12 abutting bottom surface 34 and adjacent to and abutting the overlapping end marginal region 14. The splashings 68 and 70 extend beyond the sides and the edges of the seam 30 in the overlap region of the welded flexible member 10. The extension of the splashings 68 and 70 beyond the sides and the edges of the seam 30 is undesirable for many machines such as electrophotographic copiers, duplicators and copiers that require precise edge positioning of a flexible member belt 10 during machine operation. Generally, the extension of the splashings 68 and 70 at the parallel belt edges of the flexible member belt 10 are removed by a notching operation.

A typical upper splashing 68 has a height or thickness t of about 90 micrometers and projects about 17 micrometers above the surface of the overlapping end marginal region 12. Each of the splashings 68 and 70 has an uneven but generally rectangular cross sectional shape including one side (free side) 72 (which forms a free end) extending inwardly toward top surface 32 from an outwardly facing side 74 (extending generally parallel to both the top surface 32 or the bottom surface 34). The free side 72 of the splashing 68 forms an approximately perpendicular angle $\theta_1$ at junction 76 with the bottom surface 34 of the flexible member belt 10. Likewise, the free side 72 of the splashing 70 forms an approximately perpendicular angle $\theta_2$ at the junction 78 of the free side 72 of the lower splashing 70 and the bottom surface 34 of the flexible member belt 10. Both junctions 76 and 78 provide focal points for stress concentration and become the initial points of failure affecting the mechanical integrity of the flexible member belt 10.

During machine operation, the seamed flexible imaging member belt 10 cycles or bends over rollers, particularly small diameter rollers, of a belt support module within an electrophotographic imaging apparatus. As a result of dynamic bending of the flexible imaging member belt 10 during cycling, the rollers repeatedly exert a force on the flexible imaging member belt 10 which causes large stresses to develop generally adjacent to the seam 30 due to the excessive thickness and material discontinuity thereof. The stress concentrations that are induced by bending near the junction points 76 and 78 may reach values much larger than the average value of the stress over the entire length of the flexible member belt 10. The induced bending stress is inversely related to the diameter of a roller over which the flexible imaging member belt 10 bends and directly related to the thickness of the seam 30 of the flexible imaging member belt 10. When a structural member, such as the flexible member 10, contains an abrupt increase in cross-sectional thickness at the overlap region, high localized stress occurs near this discontinuity, e.g., junction points 76 and 78.

When the flexible imaging member 10 bends over the exterior surfaces of rollers of a belt module within an electrophotographic imaging apparatus, the bottom surface 34 of the flexible imaging member belt 10 is compressed. In contrast, the top surface 32 is stretched under tension. This is attributable to the fact that the top surface 32 and bottom surface 34 move in a circular path about the circular roller. Since the top surface 32 is at greater radial distance from the center of the circular roller than the bottom surface 34, the top surface 32 must travel a greater distance than the bottom surface 34 in the same time period. Therefore, the top surface 32 must be stretched under tension relative to a generally central portion of the flexible imaging member belt 10 (the portion of the flexible imaging member belt 10 generally extending along the center of gravity of the flexible imaging member belt 10). Likewise, the bottom surface 34 must be compressed relative to the generally central portion of the flexible imaging member belt 10 (the portion of the flexible imaging member belt 10 generally extending along the center of gravity of the flexible member 10). Consequently, the bending stress at the junction 76 will be tension stress, and the bending stress at the junction 78 will be compression stress.

Compression stresses, such as at the junction point 78, rarely cause seam 30 failure. Tension stresses, such as at junction point 76, however, are a more serious problem. The tension stress concentration at the junction 76 will eventually lead to crack initiation through the electrically active layers of the flexible imaging member belt 10 as illustrated in FIG. 3. Crack 80 is adjacent to the top splashing 68 of the second end marginal region 14 of the flexible imaging member belt 10. The generally vertically extending crack 80 initiated in the charge transport layer 16 continues to propagate through the generator layer 18. Inevitably, the crack 80 extends generally horizontally to develop seam delamination 81 which is propagated through the relatively weak adhesion bond between the adjoining surfaces of the generator layer 18 and the interface layer 20.

The formation of the local seam delamination 81 is typically referred to as seam puffing. The excess thickness of the splashing 68 and stress concentration at the junction 76 causes the flexible imaging member belt 10 to perform, during extended machine operation, as if a material defect existed therein. Thus, the splashing 68 tends to promote the development of dynamic fatigue failure of seam 30 and can lead to separation of the joined end marginal regions 12 and 14 leading to severing of the flexible member belt 10. Consequently, the service life of the flexible imaging member belt 10 is shortened.

In addition to seam failure, the crack 80 acts as a depository site and collects toner, paper fibers, dirt, debris and other unwanted materials during electrophotographic imaging and cleaning processes of the flexible imaging member belt 10. For example, during the cleaning process, a cleaning instrument, such as a cleaning blade, will repeatedly pass over the crack 80. As the site of the crack 80 becomes filled with debris, the cleaning instrument dislodges at least a portion of this highly concentrated level of debris from the crack 80. The amount of the debris, however, is beyond the removal capacity of the cleaning instrument. As a consequence, the cleaning instrument dislodges the highly concentrated level of debris but cannot remove the entire amount during the cleaning process. Instead, portions of the highly concentrated debris is deposited onto the surface of the flexible imaging member belt 10. In effect, the cleaning instrument spreads the debris across the surface of the flexible imaging member belt 10 instead of removing the debris therefrom.

In addition to seam failure and debris spreading, the portion of the flexible imaging member belt 10 above the seam delamination 81, in effect, becomes a flap which moves upwardly. The upward movement of the flap presents an additional problem during the cleaning operation. The flap becomes an obstacle in the path of the cleaning instrument as the instrument travels across the surface of the flexible imaging member belt 10. The cleaning instrument eventually strikes the flap when the flap extends upwardly. As the cleaning instrument strikes the flap, great force is exerted on the cleaning instrument which can lead to damage thereof, e.g., excessive wear and tearing of the cleaning blade.

Besides damaging the cleaning blade, the striking of the flap by the cleaning instrument causes unwanted vibration in the flexible imaging member belt 10. This unwanted vibration adversely affects the copy/print quality produced by the flexible imaging member belt 10. The copy/print is affected because imaging occurs on one part of the flexible imaging member belt 10 simultaneously with the cleaning of another part of the flexible imaging member belt 10.

An embodiment of the process and apparatus of the present invention, illustrated in FIG. 4, utilizes a sealed carbon dioxide laser 103 and a rotatable compression wheel 105 to provide progressive localized heating of only a small localized site (usually a substantially circular spot) straddling the seam 30 and eliminate seam protrusions while the seam of flexible imaging member belt 10 is parked at about the 12 o'clock position of an elongated hollow support tube 90. Rotatable compression wheel 105 is biased against seam 30 by any suitable device such as a tension spring 106, air cylinder (not shown), and the like. Preferably both the laser 103 and the rotatable compression wheel 105 are supported by any suitable device 107 (partially illustrated) such as part of the frame of the seam treatment device. Although, for reasons of simplicity and economy, a single support device 107 is shown for supporting both laser 103 and compression wheel 105, separate support devices may be substituted for the single support device. A narrow slot 104 is used on each side of the hollow support tube 90 to hold the belt 10 down against the arcuate convex surface of tube 90. Any suitable slot width may be utilized. A typical width is about 0.06 inch (1.5 millimeters). The slots 104 are preferably about 180 degrees apart and extend axially along each side of tube 90. One end of tube 90 is sealed (not shown) and the other is connected by a suitable device such as a valved flexible hose (not shown) to any suitable vacuum source. After belt 10 is placed on tube 90 manually or by any suitable conventional robotic device, the initially closed valve on the flexible hose to the vacuum source is opened to suck belt 10 against the upper arcuate convex semicircular surface of tube 90 and to achieve a substantially 180 degree wrap of belt 10 around the upper arcuate convex semicircular surface of tube 90. If desired, the amount of wrap can be as low as 10 degrees if the diameter of the support tube is adequate to provide a curved convex surface to hold down the breadth of the seam region. Although less desirable, the degree of wrap may exceed 180 degrees. Plugs, seals, end-caps, or the like may be used to close the end openings of supporting tube 90 to ensure vacuum buildup. If desired, a plurality of holes of any suitable shape (e.g. round, oval, square, and the like) may be used instead of or in addition to the slots 104. The size of the slots and holes should be small enough to avoid distortion of the belt during the heating and cooling steps. The resistance of the belt to distortion when suction is applied depends on the beam strength of the specific belt employed which in turn depends upon the specific materials in and thickness of the layers in the belt. The hollow support tube 90 may be metallic or hard plastic having a smooth, polished surface and an outer radius of curvature between about 9.5 millimeters and about 50 millimeters (i.e. diameter of curvature of between about 19 millimeters and about 100 millimeters). When the radius of curvature chosen for seam heat treatment is less than about 9.5 millimeters (i.e. diameter of curvature of about 19 millimeters), the beam rigidity of the electrophotographic imaging belt will render extremely difficult any effort to bend the belt 10 sufficiently to achieve a very small curvature prior to heat treatment. When the radius of curvature is greater than about 50 millimeters (i.e. diameter of curvature of about 100 micrometers), the benefits of the present invention are not fully realized because no significant seam stress release in the imaging layer is achieved.

The sealed carbon dioxide laser 103 emits a narrow Gaussian distribution wavelength between about 10.4 micrometers and about 11.2 micrometers. The peak radiant energy wavelength emitted by the sealed carbon dioxide laser 103 is about 10.64 micrometers. Generally, pulse type radiation is preferred over continuous wave irradiation because delivery of a series of pulses provides additional control over interaction between absorption of radiation and the overall process. This leads to more control of the heating and avoidance of damage to the layer materials. The combination of using a power density of from about 0.01 watt per square millimeter to about 0.71 watt per square millimeter, a pulse duration between about 30 microseconds and about 150 microseconds, and a frequency range from about 50 hertz to about 200 hertz gives satisfactory seam stress release heat treatment results without melting, vaporization or cutting through of the seam components during the heat treatment. The specific combination utilized depends upon the specific materials being heated and the relative rate of traverse. Sealed carbon dioxide ($CO_2$) lasers are commercially available. A typical commercially available high powered sealed carbon dioxide laser heating source is a Model Diamond 64 sealed carbon dioxide laser from Coherent, Inc. which is a slab laser comprising a pair of spaced apart, planar electrodes having opposed light reflecting surfaces. The spacing of the electrodes is arranged such that light will be guided in a plane perpendicular to the reflecting surfaces. In contrast, the light in the plane parallel to the light reflecting surfaces is allowed to propagate in free space and is only confined by a resonator. Preferably, the lasing medium is standard $CO_2$ lasing mixture including helium, nitrogen and carbon dioxide with a 3:1:1 ratio plus the addition of five percent xenon. The gas is maintained between 50 and 110 torr and preferably on the order of about 80 torr. The gas is electrically excited by coupling a radio frequency generator between the electrodes. A typical sealed carbon dioxide laser is described, for example, in U.S. Pat. No. 5,123,028, the entire disclosure thereof being incorporated herein by reference. Sealed carbon dioxide lasers are also described in U.S. Pat. Nos. 5,353,297, 5,353,297 and 5,578,227, the entire disclosures thereof also being incorporated herein by reference. Although this sealed carbon dioxide laser has a 150 watt capability, it is adjusted to only deliver a lower output of, for example, about 6 watts for the seam heat treatment process of this invention. A phase shift mirror may be used to transform a laser beam with linear polarization into a beam with circular polarization. To obtain a circularly polarized beam, a phase shift mirror is positioned with an incidence angle of 45 degrees and the laser beam output with a plane of polarization parallel to the laser base is rotated 45 degrees to the plane of incidence. The resulting circularly polarized beam of heat energy is focused with an image lens into a desired size small localized site on the outer surface of the seam. A Melles Griot Zinc Selenide Positive Lens with focal distance of 63.5 mm (2.5 inches) may be used as the image lens. In the process of the present invention, all of the radiant energy emission from the carbon dioxide laser 103 progressively strikes localized sites encompassing the seam and regions of the imaging belt immediately adjacent the seam to deliver instant heating followed by quick cooling as the belt 10 with the supporting cylindrical 90 is traversed by the beam of heat energy from the laser heating source.

Preferably, the raw laser heat energy beam emitted from a laser has a circular cross section. However, any other suitable cross sectional shape may be utilized to raise the temperature of a localized site along the seam. The diameter of a raw beam emitted by a laser is normally constant along the entire length of the beam. The thermal energy radiation emitted from a carbon dioxide laser is directed at the seam of the belt and the thermal energy radiation from the laser forms a localized site, such as a round spot, straddling the seam during traverse of the seam. The heated localized site, such as a round spot, on the surface of the seam preferably has an average width of between about 3 millimeters and about 25 millimeters measured in a direction perpendicular to the imaginary centerline of the seam. For example, a Model Diamond 64 sealed carbon dioxide laser from Coherent, Inc. has a circular raw heat energy beam having a diameter of about 6 millimeters. This raw laser heat energy beam will form a heated localized site or spot having a diameter of about 6 millimeters on the belt seam. If desired, the 6 millimeter spot size of the thermal energy striking the outer surface of the seam can be reduced for small seam area heating by masking the emitted raw laser heat energy beam using any suitable device such as a metal template, to give a 3 millimeter to 6 millimeter heated localized spot size measured in a direction perpendicular to the imaginary centerline of the seam. Although the template may alter the heated localized spot shape to any suitable and desired shape such as an oval, square, rectangle, hexagon, octagon and the like, a heated localized site or spot having a circular spot is preferred. Moreover, where for example, the laser heat energy beam has a diameter of about 6 millimeters and a larger heat spot is desired on the outer surface of the belt seam, the laser beam may be defocused using any suitable device such as a zinc selenide lens between the laser beam source and the belt seam. Thus, by varying the relative distances between the laser beam source, the lens and the belt seam, the 6 millimeter diameter laser beam may be defocused to give a larger spot having a diameter greater than about 6 millimeters and preferably less than about 25 millimeters in diameter measured in a direction perpendicular to the imaginary centerline of the seam for stress release treatment of large seam areas. If a mask is employed to change the shape of the raw laser heat energy beam or the defocused heat energy beam to form a spot shape other than round, the preferred heated localized site or spot size that straddles the seam has an average diameter between about 3 millimeters and about 25 millimeters measured in a direction perpendicular to the imaginary centerline of the seam. When the average diameter of the heated localized site measured in a direction perpendicular to the imaginary centerline of the seam is less than about 3 millimeters, the resulting stress release area is not enough to cover a seam region which has a width of about 3 millimeters from one side of the seam region to the other. When the average diameter of the heated spot is greater than about 25 millimeters, the stress release area exceeds the intended seam treatment region and extends into the electrophotographic imaging zone of the belt normally used for image formation.

Since the carbon dioxide laser delivers a constant diameter raw heat energy beam, the physical distance from the seam surface of the imaging belt to the laser is not critical for the heat treatment process of this invention, if the intended seam heat treatment spot size is the same as the diameter of the raw laser beam or smaller than the raw laser beam by using a masking template. The carbon dioxide laser spot substantially instantaneously elevates the temperature of polymer material in only a small localized region or site of the imaging layer of the imaging member belt above the glass transition temperature (Tg). Although the thermoplastic polymer material must be heated to at least the glass transition temperature thereof, such heated polymer material need be only in the upper portion of the seam area to achieve the seam treatment objectives of this invention. However, if desired, heating of the seam region completely through the thickness or cross-section thereof may be accomplished during heating of a localized site. Elevation of the temperature of only a small localized region or site along the seam from one edge of the belt to the other to at least the glass transition temperature of the thermoplastic polymer material is accomplished progressively as the heat energy beam traverses the width of the belt along the seam. The expression "Tg of a polymer material" as employed herein is defined as the Tg of the imaging layer of an imaging member. The imaging layer of an imaging member is a charge transport layer if the imaging member is an electrophotographic imaging member and a dielectric layer if the imaging member is an electrographic imaging member. Since the charge transport layer is a composite comprising a polymer binder, a dissolved or molecularly dispersed charge transport organic compound, and optional pigment particles, the Tg in this case is a Tg of the combination. Thus, the expression "polymer material" as employed herein is defined as the polymer and any other material present in an imaging layer. Such polymer material used for electrophotographic imaging layer coating applications normally have a Tg is at least about 45° C. to satisfy most imaging belt machine operating conditions. Preferably, the heat treatment of belts is carried out between about the Tg and about 25° C. above the Tg of the polymer material in at least the upper portion of the imaging layer to achieve sufficient seam stress release. Melting, vaporization or cutting through of the seam components during heat treatment should be avoided because this can weaken the belt seam. The heat energy beam should be sufficiently close to the rotatable wheel to facilitate leveling by the wheel of protrusions extending outwardly from the seam while the temperature of the localized site heated by the laser heat energy beam remains at a temperature between about the Tg and about 25° C. above the Tg of the thermoplastic polymer material in the seam. Although a laser is shown as a heat source for the heat energy beam, any other suitable source for a heat energy beam may be substituted for the laser. Thus, reference 103 can also represent another device for supplying heat energy such as a tungsten halogen quartz bulb focused with a reflector having a hemiellipsoid shape. The tungsten halogen quartz bulb infrared ray heat energy source is positioned at the center of focus inside the reflector for converging the reflected radiant energy into a heated substantially circular spot on the seam and region immediately adjacent the seam of the electrostatographic imaging member belt while the belt is in intimate conformance contact with the arcuate surface of the support member. The expression "hemiellipsoid shape" as employed herein is defined as the shape of substantially half of an ellipsoid which is severed by a slice through the midpoint of the long axis of the ellipsoid, the slice being along a path perpendicular to the long axis of the ellipsoid. Expressed in different language, if an ellipse were sliced in a direction perpendicular to the midpoint of the long axis of the ellipse to form two halves and if one of the halves is rotated about this long axis, the surface created by the path of rotation would define a hemiellipsoid. Thus, a hemiellipsoid would have half the total surface area of an ellipsoid. An ellipse is an elongated circle or regular oval which forms a closed plane curve generated by a point so moving that its distance from a fixed point divided by its distance from a fixed line is a positive constant less than 1. An ellipsoid is a surface, all plane sections of which, that are parallel to that of the long axis, are ellipses and all plane sections of which, that are perpendicular to the long axis, are circles. An ellipse or ellipsoid has two focal points. When a radiation source is positioned at one of the focal points of an ellipsoid reflector, all of the radiation from the radiation source is focused by the reflector to converge at the other focal point. Each of these focal points is a center of focus for the half of ellipsoid in within which it the focus point is located. A more detailed description of the tungsten halogen quartz bulb focused with a reflector having a hemiellipsoid shape may be found in U.S. patent application Ser. No. 09/004,289, filed on Jan. 8, 1998, in the names of Yu et al., entitled "SEAM STRESS RELEASE IN FLEXIBLE ELECTROSTATOGRAPHIC IMAGING BELTS", the entire disclosure thereof being incorporated herein by reference. Thus, the beam of heat energy forms a heated localized site having any suitable shape which straddles the seam. The localized heated site preferably has an average diameter of between about 3 millimeters and about 25 millimeters within which the beam of heat energy substantially instantaneously heats the thermoplastic polymer material in the seam and the regions of the belt adjacent each side of the seam directly under the localized heated site to at least the glass transition temperature (Tg) of the polymer material matrix without significantly heating the elongated support member. Since the heated localized site must be at at least the glass transition temperature of the thermoplastic polymer in the seam when contacted with a compression wheel, such timely contact by the wheel is ensured by positioning the wheel immediately adjacent to the heat energy beam. Therefore, the heated site is adjacent to and tangential to the outer periphery of the compression wheel during compression by the rolling wheel to smooth out protrusions in the heated localized seam site. After smoothing of the protrusions, the localized site is cooled by thermal conduction of heat from the seam to the mass of the support tube 90.

Because of bulk and weight considerations, the carbon dioxide laser 103 with the compression wheel attachment 105 is preferably stationary during treatment of the belt seam. The rotatable compression wheel 105 has a peripheral surface with an arcuate concave cross section having a curvature which perfectly matches or is slightly larger than the predetermined curvature of the arcuate convex substantially semicircular cross section of the elongated surface of the upper half of the support tube and produces a compression line pressure contact between the peripheral surface of the wheel and outer surface of the seam. The compression line pressure against the seam delivered by the wheel is augmented by tension force generated by spring 106. To produce superior seam area protrusion elimination results and an improved surface morphological profile, it is important that the peripheral surface of the compression wheel has an arcuate concave radius of curvature. Preferably, the arcuate concave radius of curvature is between about 9.5 millimeters and about 55 millimeters. The arcuate concave radius of curvature should perfectly match or be slightly larger (e.g., up to about 10 percent larger) than the convex surface radius of curvature of the support tube 90 which preferably has a convex radius of curvature of between about 9.5 millimeters and about 50 millimeters. The radius of the compression wheel, measured from its center of rotation or axis to the midpoint of line contact against the seam, is between about ⅛ inch (3.2 millimeters) and about ½ inch (12.7 millimeters). Measurement of the radius of the compression wheel is analogous to measuring the radius at the waist of an hour glass, the compression wheel having a cross sectional shape (taken along the axis of the hour glass) similar to that of an hour glass. Since the heated localized site cools very quickly, a very small compression wheel radius measured at the "waist" allows delivery of the laser beam from the laser beam source to the seam closer to the imaginary axis of the wheel and almost in tangential contact with waist of the wheel (e.g., bottom of the arcuate channel at about the 3 o'clock position of the wheel when a vertically aligned compression wheel is employed). Preferably contact of the waist or any other part of the wheel by the laser is avoided to prevent heat build up in the wheel. By positioning the beam of the laser close to the waist of a small radius wheel, the localized site heated by the laser is very close to the line of compressive contact exerted by the compression wheel against the seam region from one side of the seam region to the other and hastens application of compression forces before the localized site heated by the laser cools to a temperature below the Tg of heated polymer material in the localized site thereby ensuring effective smoothing of the seam region. However, the radius at the waist of the wheel should not be so small that rigidity of the compression wheel is compromised. Thus, for example, the waist radius of the compression wheel should not be so small as to cause the wheel or wheel support member to bend when it is used to apply a compression force to the seam region. The limiting waist radius is strongly dependent on the specific materials used for the wheel. Similarly, bending resistance is also dependent on the specific materials selected for the wheel. If desired, the laser beam may be tilted, inclined or angled (as opposed to being vertically aligned) to position the localized site heated by the laser to a point even closer to the line of compressive contact between the compression wheel and the seam region. Since the line of compressive contact generated by the rolling wheel contacting the seam at least matches or is greater than the band width (seam region width) of the localized site on the seam heated by the heat energy beam, the continuous rolling action of the compression wheel across the entire belt width, the lines of compressive contact generated is perpendicular to the seam length and of infinite number or continuum which thereby achieves full seam smoothing and stress relaxation of the entire seam region. Therefore, it is preferably that the line of compressive contact forms an arc of from about 3 millimeters to about 25 millimeters in length. Close matching of the radii of curvatures of the convex surface of the elongated belt support member and the concave peripheral surface of the compression wheel is important in order to achieve a uniform line of compressive contact and to effect full treatment coverage over the entire seam region, the entire seam region consisting of a seam overlap and a splashing adjacent to each side of the overlap. By comparison, if a compression wheel having a peripheral surface with a cross section having an infinite radius of curvature (essentially a straight line) is used, the process will yield only point contact with the seam of a belt parked over an arcuate convex surface support member having a radius of curvature of between about 9.5 millimeters and about 50 millimeters and the objectives for treatment of the entire seam region will not be achieved. The compression wheel 105 may be of any suitable material. Typical wheel materials include, for example, metallic, hard plastic or composite materials having a smooth contacting surface. If desired, the contacting surface may comprise a thin coating layer of low surface energy material such as Teflon, polysiloxane, polyimide such as kapton, and the like. Since the laser heat source and compression wheel assembly is preferably stationary during seam treatment, tube 90 bearing belt 10 with seam 30 is preferably moved manually or automatically and substantially continuously or incrementally under the carbon dioxide laser/compression wheel assembly. Any suitable horizontally reciprocateable carriage system 108 may be utilized to effect relative motion between the heat source and arcuate supporting surface of the support tube. The horizontally reciprocateable carriage system maintains the heat source and arcuate supporting surface of the support member parallel and spaced from each other along the entire length of the seam from one edge of the imaging belt to the other. Alternatively, the tube 90 bearing belt 10 with seam 30 may be held stationary and the carbon dioxide laser and compression wheel assembly may be moved substantially continuously or incrementally either manually or automatically. Moreover, if desired, both the tube 90 and laser/compression wheel assembly may be simultaneously moved relative to each other. Any suitable means such as a horizontally reciprocateable carriage system may be used to move tube 90 and/or the laser and compression wheel assembly. Typical horizontally reciprocateable carriage systems include, for example, ball screw, two way acting air cylinder, lead screw and motor combination, belt or chain drive slide system, and the like. A relative speed of movement between the heating source/compression wheel assembly and the support tube holding seamed belt 10 from about 1 centimeter to about 20 centimeters per second provides satisfactory results. However, a relative speed between about 2.5 centimeters and about 12.5 centimeters per second yields optimum results. The process of this invention flattens all protrusions on the welded seam and achieves heat stress release in the seam region as well.

Although the imaging member belt 10 is shown to be held down against the convex upper surface of support tube 90 in FIG. 4, the elongated support member may have any other suitable shape such as an elongated half circle, an elongated partial circle, a bar having an arcuate convex surface on the side contacting the seam, and the like, provided the support member employed has an arcuate convex curve surface sufficient to retain and hold down the entire length of the seam region of the parked belt during seam treatment.

Figure 5:
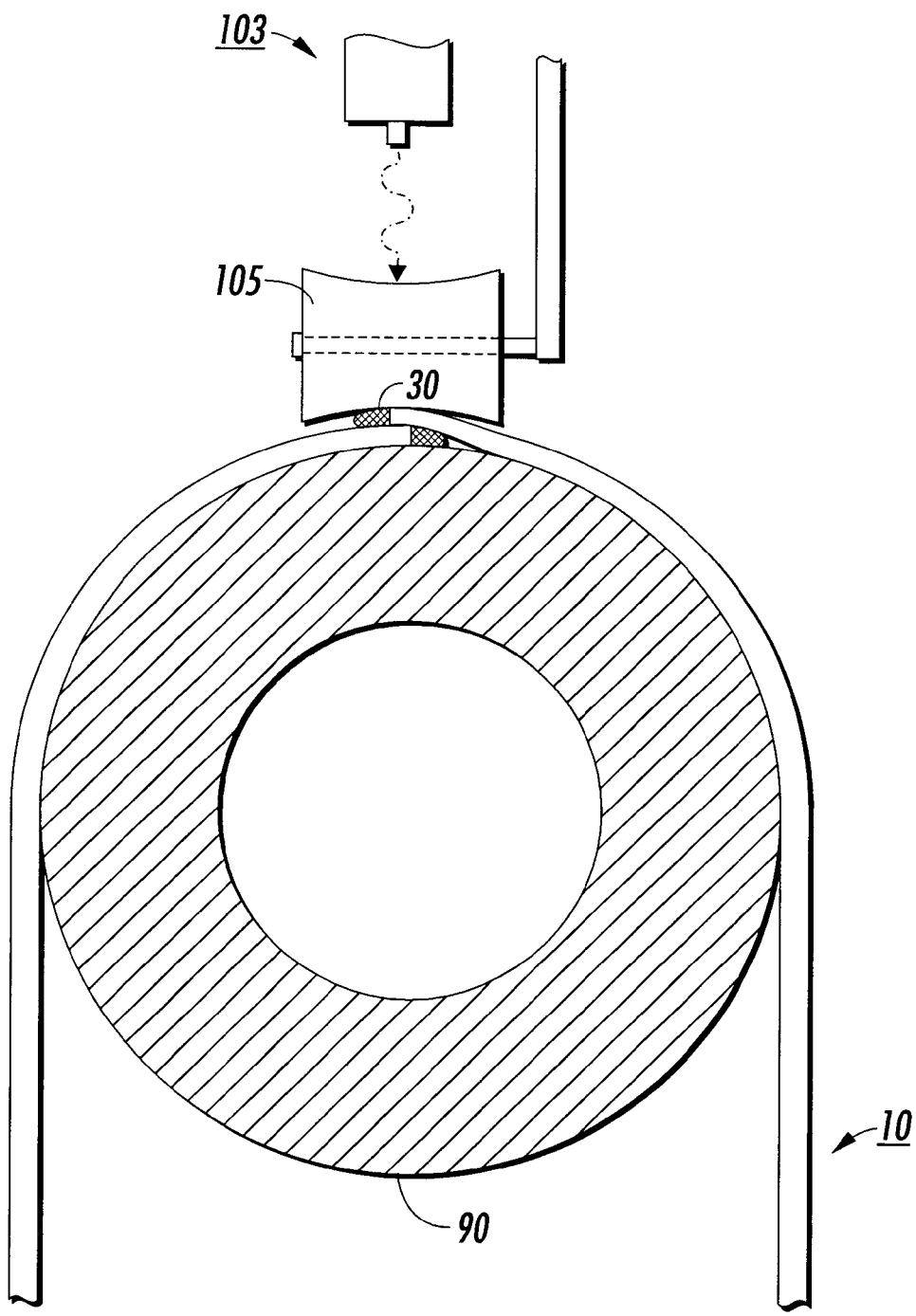
FIG. 5 illustrates the schematic, sectional side view of the seam treatment processing arrangement of FIG. 4.

FIG. 5 shows a schematic cross-sectional side view presentation of the seam treatment system illustrated in FIG. 4.

For heat treatment of a flexible imaging member belt having a slanted seam (i.e. a seam that is an angle other than 90 degrees with each edge of belt 10), the heating source may be set to precisely track the seam when traversing the entire belt width. However, it is preferred that the belt is cocked and adjusted such that the seam is positioned parallel to an imaginary axis of the support cylinder member (i.e., without skewing) along the top of the support cylinder member after belt mounting.

Figure 6:
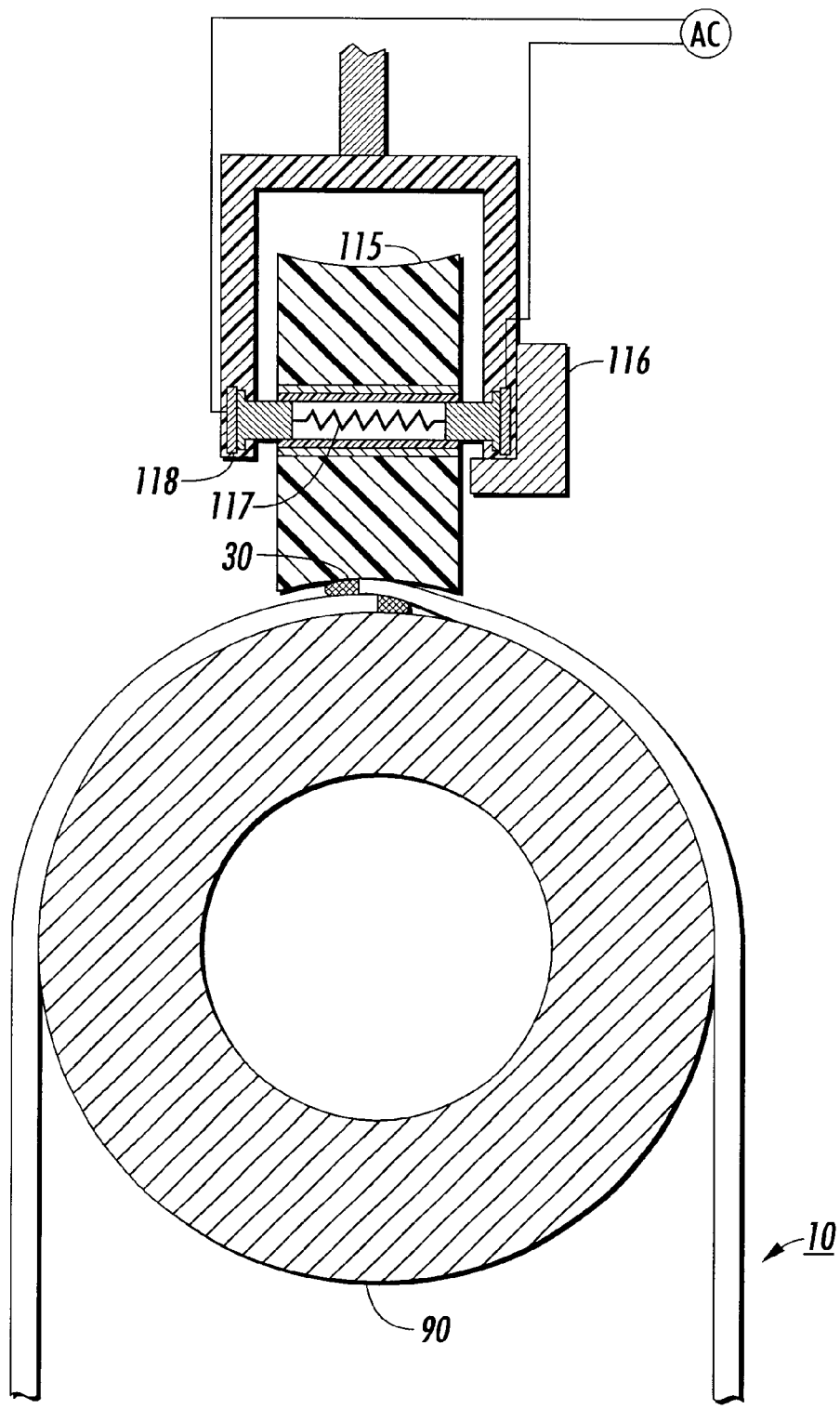
FIG. 6 shows an isometric, schematic view of a seamed flexible electrophotographic imaging member belt in which the seam is parked on and held over the arcuate convex surface of an elongated support member by vacuum while subjected to an alternative seam stress release and protrusion spots elimination process, utilizing a hot rolling compression wheel.

Illustrated in FIG. 6 is an alternate seam stress release heat treatment and protrusion elimination process of the present invention in which a single heated compression wheel 115, rolling over the seam 30 of belt 10 parked on elongated support tube 90, is employed to simultaneously achieve seam heat stress release and seam surface smoothing, including protrusion spots elimination as well. The peripheral surface of wheel 115 has an arcuate concave cross section having a curvature which perfectly matches or is slightly larger than the predetermined curvature of the arcuate convex surface of the elongated surface of the upper half of support tube 90. This peripheral surface should be maintained at a temperature sufficiently to raise the temperature of the thermoplastic material in at least the upper half of the belt seam to the glass transition temperature. The peripheral surface of wheel 115 preferably has a thin coating surface of abhesive material such as Teflon and the like to prevent imaging layer material from adhering to the wheel surface during the seam treatment process. The heated compression wheel 115 is preferably metallic with a smooth peripheral surface. Heating of the wheel may be accomplished by any suitable device such as, for example, by an electromagnetic heating mechanism 116 to give the desired temperature when wheel 115 traverses the width of belt 10 along on the seam 30. Alternatively, any other suitable device, such as a resistance wire heating system 117 may be employed to heat compression wheel 115. Where the resistance wire is part of the wheel, any suitable electrical connection such as slip rings 118 may be used to provide electrical energy to the resistance wires. Sufficient heat energy should be supplied to wheel 115 to adequately heat the peripheral surface thereof. Preferably, the hot rotatable compression wheel 115 is not reciprocated and the support tube 90 carrying belt 10 is moved during the seam treatment. However, if desired, the support tube and belt may be stationary and the wheel reciprocated or both may be reciprocated to achieve relative motion with each other. The cross section of the heated compression wheel 115, has a concave peripheral surface radius of curvature perfectly matching or slightly larger than the radius of curvature the arcuate convex surface of the supporting tube 90 described above to provide seam stress release and eliminate protrusions.

Figure 7:
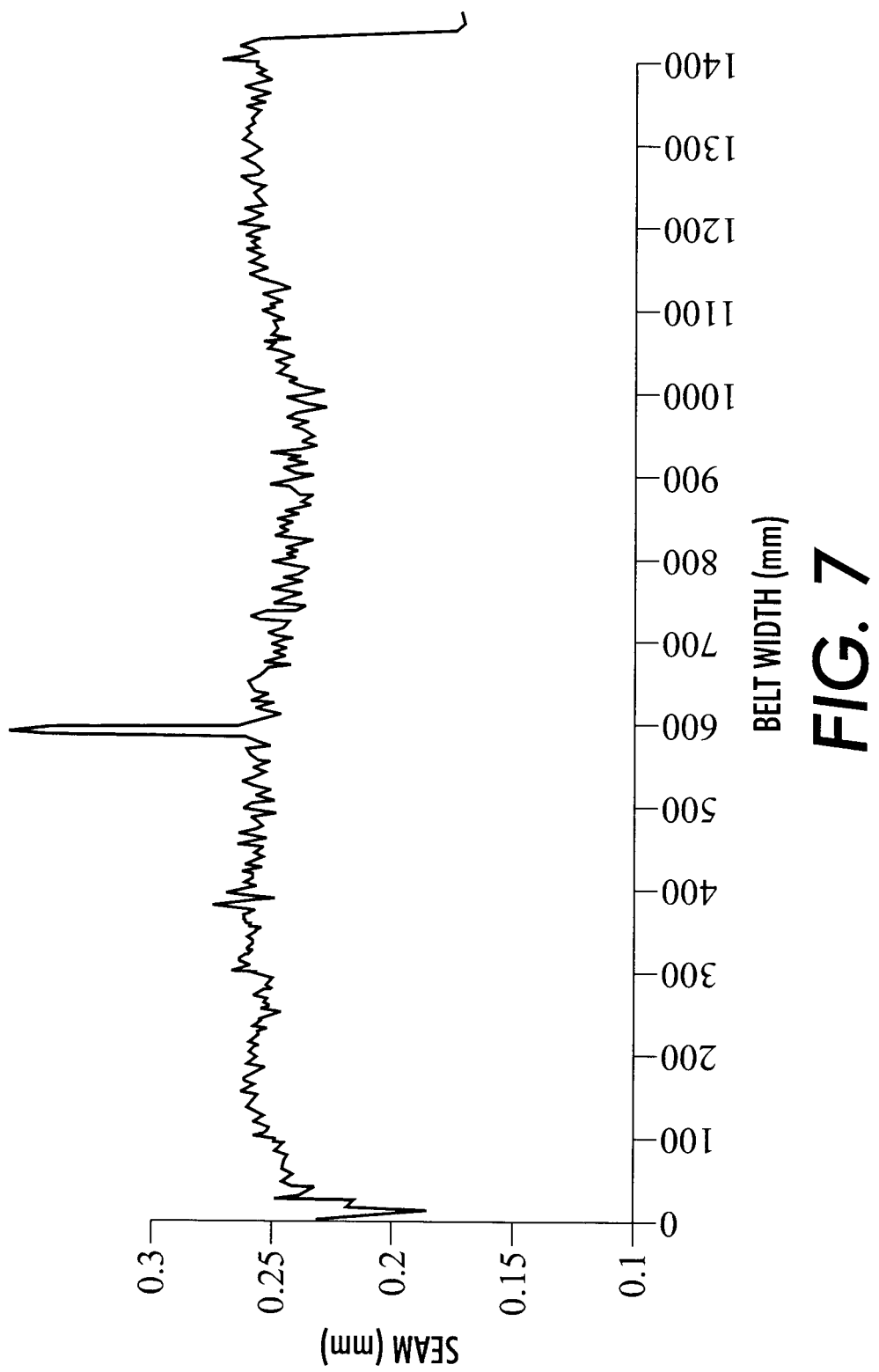
FIG. 7 illustrates a typical surface morphological profile of an ultrasonic welded seam of a flexible electrophotographic imaging member belt having a 120 micron high seam protrusion spike.

FIG. 7 shows a morphological surface profile measured for a seam of a typical ultrasonically welded seam of an electrophotographic imaging member belt having an anomaly high seam protrusion, a 120 micrometer spike, that is capable of cutting an elastomeric cleaning blade. This undesirable protrusion also interferes with the operational functions of electrostatographic imaging machine subsystems.

Figure 8:
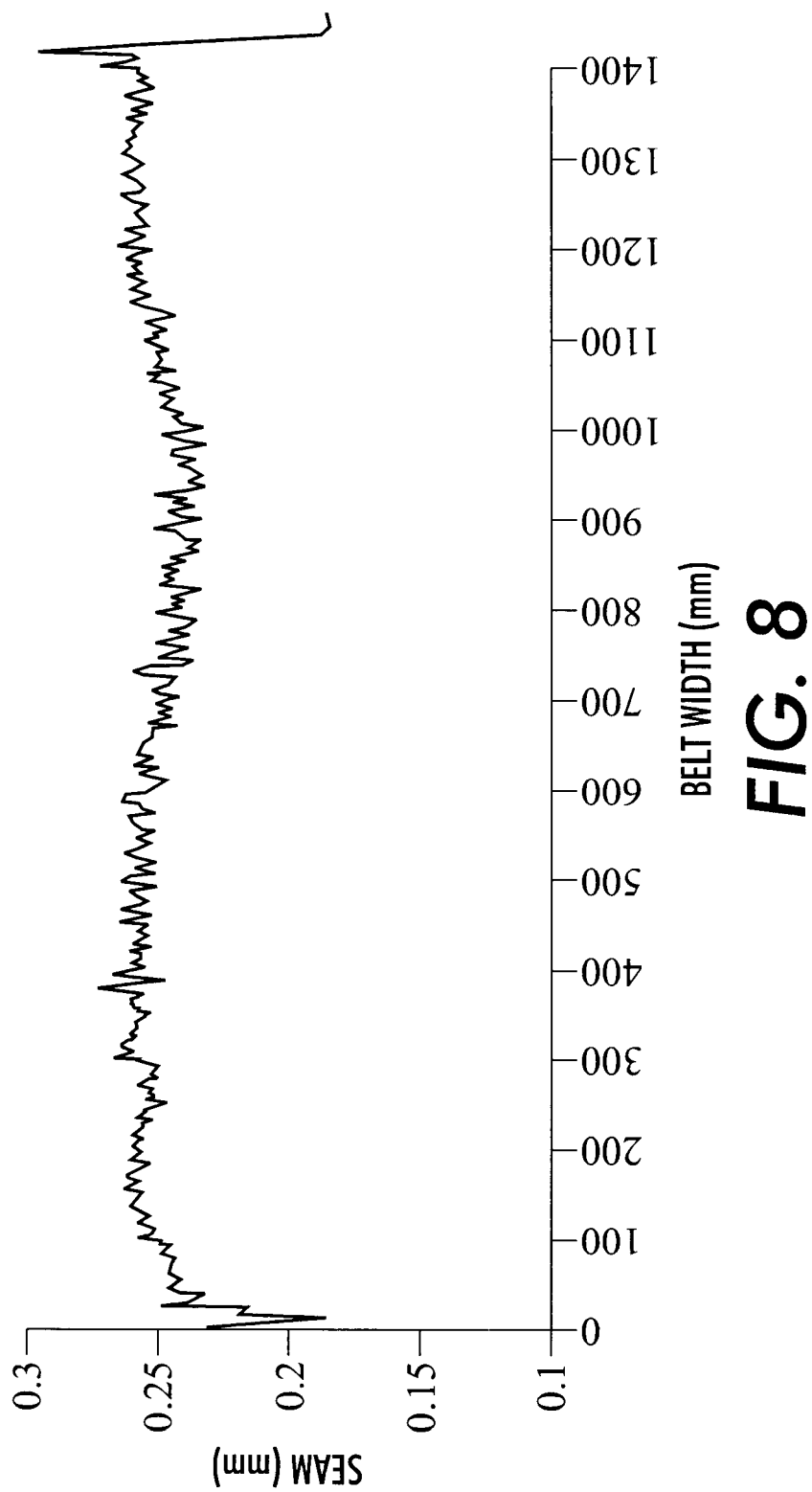
FIG. 8 shows the corresponding surface morphological profile of the same seam of the same flexible electrophotographic imaging member belt of FIG. 7, but free of the seam protrusion spike after processing with the seam treatment process of the present invention.

Illustrated in FIG. 8 is a morphological surface profile measured for the very seam of FIG. 7, but is free of the protrusion spike after the seam is processed with the stress release treatment/protrusion elimination process of the present invention.

Details relating to specific materials, proportions and dimensions of seamed flexible electrostatographic imaging member belts are well known and described, for example, in U.S. Pat. No. 5,240,532, the entire disclosure thereof being incorporated herein by reference.

The seam stress release heat treatment and protrusion elimination process of this invention is designed for high speed processing. The treating of the seam of flexible electrostatographic imaging member belt 10 described above and in the Working Examples that follow comprise bending a short segment of an electrostatographic imaging member belt into an arc having a substantially semicircular cross section and an imaginary axis which transverses the width of the belt with the seam situated along the middle of the arc. The desired arc may be conveniently formed by parking the seam of the flexible electrostatographic imaging member belt 10 on the arcuate convex surface of an elongated support member, the arcuate convex surface having at least a substantially semicircular cross section having a radius of curvature of between about 9.5 millimeters and about 50 millimeters. The elongated supporting member may simply be a solid or hollow tube or bar. Since the belt 10 need only contact the arcuate convex surface, the remaining surface of the elongated supporting member may be of any other suitable shape. For example, a bar having a rectangular cross section may be shaped by machining to round off two adjacent corners and their subtended surface so that when viewed from one end, half of the bar has a semicircular cross section with no corners and the other half has two of the original 90° corners. It is the rounded part of the bar that provides the arcuate convex surface.

If desired, infrared camera or temperature sensors may be employed to register the effectiveness of seam region heating in order to ensure that sufficient heat energy is applied to raise the temperature of the seam region above the glass transition temperature of the thermoplastic polymer matrix upper coatings, such as in the charge transport layer of photoreceptors, while avoiding undue heating of the support member.

A typical temperature range for heat treating a flexible photoreceptor belt having a 24 micrometer thick charge transport layer containing a polycarbonate thermoplastic polymer and dissolved or molecularly dispersed charge transport compound, is between about 82° C. and about 97° C. Cooling of the heat treated seam may be conducted in ambient air with much of the heat being absorbed by the large mass of the supporting member. In practice, since the photoreceptor is very thin, about 0.12 millimeters in thickness, the relatively large mass of the supporting member normally acts as an effective heat sink. If desired, any other suitable cooling methods may be used. Typical cooling methods include chilled water in the supporting tube, cold air blowing onto the material, and the like. Generally, the traversing, heating and quenching of a seam are accomplished within about 3 and about 15 seconds with the process of this invention for belts having a width of between about 20 centimeters and about 60 centimeters.

When attempts are made to smooth the seam region of an imaging belt at temperatures below the Tg of the polymer material in the upper half of the seam region, such as at room ambient while the seam region is held down over an elongated arcuate convex support member (e.g., by pressing the seam region with a metal surface at high pressures to achieve cold flow of the polymer material), there is a high possibility of causing material failure of the imaging layer at the junction site where the top seam splashing meets the imaging layer because the imaging layer (e.g., charge transport layer having an inherent low break strain of only about 0.03) is brittle and will easily initiate a crack upon subjected to an externally applied compressive force. Thus, for example an imaging belt having a seam region will instantly develop a crack at the charge transport layer/splashing junction site as soon as the seam region is bent and held down to conform to a right angle wrap around the corner of a table top. In sharp contrast, an imaging belt having a seam region pressed against the corner of the same table top but previously treated at an elevated temperature above the Tg of the polymer material (the imaging layer) will exhibit no seam region cracking problem Thus, the process and apparatus of this invention provides a belt in which the seam is free of high protrusions, smoother surface morphology, and free of fatigue induced bending seam stress during dynamic flexing over the rollers of a belt support module during image cycling. The resulting stress release seam prevents premature seam cracking and delamination in the welded seam region as a belt is cycled over belt module support rollers during imaging. In summary, the process of this invention provides imaging belts having a seam that is free of high protrusions, released of stress, and with a smoother surface morphology. This process substantially increases imaging member belt production yield and significantly reduces belt unit manufacturing costs. It is important to note that after the heat treatment and seam protrusion elimination process of this invention, cracking has never been observed to be a problem when the seam region is repeatedly, under compression, cycled through any straight, flat runs between roller supports and subjected to fatigue bending tension stress conditions when flexed over each belt support roller in an imaging system.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

An electrophotographic imaging member web was prepared by providing a roll of titanium coated biaxially oriented thermoplastic polyester (Melinex, available from ICI Americas Inc.) substrate having a thickness of 3 mils (76.2 micrometers) and applying thereto, using a gravure applicator, a solution containing 50 parts by weight 3-aminopropyltriethoxysilane, 50.2 parts by weight distilled water, 15 parts by weight acetic, 684.8 parts by weight of 200 proof denatured alcohol, and 200 parts by weight heptane. This layer was then dried to a maximum temperature of 290° F. (143.3° C.) in a forced air oven. The resulting blocking layer had a dry thickness of 0.05 micrometer.

An adhesive interface layer was then prepared by applying to the blocking layer a wet coating containing 5 percent by weight, based on the total weight of the solution, of polyester adhesive (Mor-Ester 49,000, available from Morton International, Inc.) in a 70:30 volume ratio mixture of tetrahydrofuran/cyclohexanone. The adhesive interface layer was dried to a maximum temperature of 275° F. (135° C.) in a forced air oven. The resulting adhesive interface layer had a dry thickness of 0.07 micrometer.

The adhesive interface layer was thereafter coated with a photogenerating layer containing 7.5 percent by volume trigonal selenium, 25 percent by volume N,N'-dipheny-N, N'-bis(3-methylphenyl)-1,1'-biphenyl-4,4'-diamine, and 67.5 percent by volume polyvinylcarbazole. This photogenerating layer was prepared by introducing 160 gms polyvinylcarbazole and 2,800 mls of a 1:1 volume ratio of a mixture of tetrahydrofuran and toluene into a 400 oz. amber bottle. To this solution was added 160 gms of trigonal selenium and 20,000 gms of 1/8 inch (3.2 millimeters) diameter stainless steel shot. This mixture was then placed on a ball mill for 72 to 96 hours. Subsequently, 500 gms of the resulting slurry were added to a solution of 36 gms of polyvinylcarbazole and 20 gms of N,N'-diphenyl-N,N'-bis (3-methylphenyl)-1,1'-biphenyl-4,4'-diamine dissolved in 750 mls of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the coating web, having the blocking layer and adhesive layer, was deliberately left uncoated by any of the photogenerating layer material to facilitate adequate electrical contact with the ground strip layer that is applied later. This photogenerating layer was dried to a maximum temperature of 280° F. (138° C.) in a forced air oven to form a dry thickness photogenerating layer having a thickness of 2.0 micrometers.

This coated imaging member web was simultaneously overcoated with a charge transport layer and a ground strip layer by co-extrusion of the coating materials. The charge transport layer was prepared by introducing into an amber glass bottle in a weight ratio of 1:1 N,N'-diphenyl-N,N'-bis (3-methylphenyl)-1,1'-biphenyl-4,4'-diamine and Makrolon 5705, a polycarbonate resin having a molecular weight of about 120,000 commercially available from Farbensabricken Bayer A. G. The resulting mixture was dissolved to give 15 percent by weight solid in methylene chloride. This solution was applied on the photogenerator layer by extrusion to form a coating which upon drying gave a thickness of 24 micrometers.

The strip, about 3 mm wide, of the adhesive layer left uncoated by the photogenerator layer, was coated with a ground strip layer during the co-extrusion process. The ground strip layer coating mixture was prepared by combining 23.81 gms. of polycarbonate resin (Makrolon 5705, 7.87 percent by total weight solids, available from Bayer A. G.), and 332 gms of methylene chloride in a carboy container. The container was covered tightly and placed on a roll mill for about 24 hours until the polycarbonate was dissolved in the methylene chloride. The resulting solution was mixed for 15–30 minutes with about 93,89 gms of graphite dispersion (12.3 percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade dispersed in a water cooled, jacketed container to prevent the dispersion from overheating and losing solvent. The resulting dispersion was then filtered and the viscosity was adjusted with the aid of methylene chloride. This ground strip layer coating mixture was then applied, by co-extrusion with the charge transport layer, to the electrophotographic imaging member web to form an electrically conductive ground strip layer having a dried thickness of about 14 micrometers.

The resulting imaging member web containing all of the above layers was then passed through a maximum temperature zone of 240° F. (116° C.) in a forced air oven to simultaneously dry both the charge transport layer and the ground strip.

An anti-curl coating was prepared by combining 88.2 gms of polycarbonate resin (Makrolon 5705, available from Goodyear Tire and Rubber Company) and 900.7 gms of methylene chloride in a carboy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear dispersion to form the anti-curl coating solution. The anti-curl coating solution was then applied to the rear surface (side opposite the photogenerator layer and charge transport layer) of the electrophotographic imaging member web by extrusion coating and dried to a maximum temperature of 220° F. (104° C.) in a forced air oven to produce a dried coating layer having a thickness of 13.5 micrometers.

EXAMPLE II

The electrophotographic imaging member web of Example I having a width of 353 millimeters, was cut into four separate rectangular sheets of precise 559.5 millimeters in length. The opposite ends of each imaging member were overlapped 1 mm and joined by ultrasonic energy seam welding process using a 40 Khz horn frequency to form four seamed electrophotographic imaging member belts. Three of these seamed belts are to be subjected to a seam heat treatment stress release and protrusion elimination process while the remaining untreated belt is used to serve as a control.

EXAMPLE III

To effect seam treatment processing, each of the three welded electrophotographic imaging member belts described in Example II was suspended over a horizontally movable cantilevered supporting aluminum tube, having a 2-inch (5.08 centimeters) diameter, a wall thickness of about 1/4 inch (6.35 millimeters), and an anodized outer surface, with the welded seam parked directly along the top (i.e. 12 o'clock position) of the support tube and being parallel to the axis of the tube. The tube contained a pair of slots, one slot at the 9 o'clock position and the other at the 3 o'clock position. Each slot extended along the length of the imaging member belt width and was 2 millimeters wide. The free end of the tube was sealed by a cap and the supported end was connected to a flexible hose leading through a valve to a vacuum source. The vacuum source was maintained at a pressure of about 40 mm Hg. The belt in the seam area was held down against the upper surface of the tube when the valve to the vacuum source was opened so that the seam area conformed to the shape of the upper surface of the tube. The temperature of the seam area was raised to about 90° C., 8° C. above the glass transition temperature (Tg) of the charge transport layer, with a sealed carbon dioxide laser heating source (Model Diamond 64, available from Coherent, Inc.) which has an adjacent compression wheel attachment. This seam treatment processing was then carried out according to the schematic arrangement illustrated in FIG. 4. The carbon dioxide laser heating source had a 150 wattage power capability, but for the present seam treatment process, it was adjusted to deliver an energy output of only 5 watts at a 6 millimeter diameter of raw laser beam spot. An infrared sensing camera was employed to adjust laser delivery of 150 hertz frequency, 50 microseconds pulse duration, and a seam traversing speed of 2 inches per second (5.08 centimeters per second) to ensure that the seam treatment spot temperature was 90° C., sufficient to soften the charge transport layer in the seam area for effective seam stress release and protrusion elimination, but not so high as to cause excessive charge transport layer flow, burning of the imaging member coating layers and excessive heating of the support tube.

The laser heat source emitted a dominant radiant wavelength of 10.64 micrometers and formed a substantially circular laser spot of about 6 mm in diameter incident over and straddling the seam area to provide instant seam heating in the localized site with such heating progressing along the length of the seam, as the support and belt were moved under the heat source/compression wheel assembly at a seam traversal speed of 2 inches (5.08 centimeters) per second and a 11.6 pounds compression force was applied to the wheel with a spring to yield a 3.5 mm (0.138 inch) line contact over the seam region. The entire seam stress release heat treatment and protrusion elimination process for each imaging member belt was completed in about seven seconds.

The resulting 6 mm wide treated seam area across the width of the belt did not exhibit a seam area set and had no notable circumferential belt dimensional shrinkage. Furthermore, comparison of the results of seam morphological measurements obtained before and after invention seam treatment processing showed that the seam splash roughness was significantly decreased by about 40 percent whereas the thickness of the original top seam splash 68 and the splash height from seam overlap to splash, shown in the cross-sectional view in FIG. 2, were effectively reduced by 13.4 percent and 42.2 percent, respectively. It is particularly important to emphasize that one of the seamed electrophotographic imaging member belt having a seam protrusion spike of about 125 micrometers in height was completed eliminated as result of this invention seam treatment process. The effectiveness of seam protrusion spike elimination was evident by direct comparison of surface profile measurements of the very same seam measured prior to treatment, as shown in FIG. 7, and after treatment with the process of this invention, as shown in FIG. 8.

EXAMPLE IV

The control electrophotographic imaging member belt of Example II and the three electrophotographic imaging member belts obtained with the seam treatment process of the present invention, as exemplified by Example III, were each dynamically cycled and print tested in a xerographic machine, having a belt support module comprising a 25.24 mm diameter drive roller, a 25.24 mm diameter stripper roller, and a 29.48 mm diameter tension roller to exert each belt a tension of 1.1 pounds per inch. The belt cycling speed was set at 65 prints per minute.

The control, non-heat treated imaging member belt of Example II, was cyclic tested to only about 56,000 prints because the testing had to be terminated due to premature seam cracking and delamination problems.

When the same belt cycling procedure was repeated with each of the imaging member belts treated with the process of the present invention illustrated in Example III, neither seam failure nor notable ripple appearance in the image zones were observed after 250,000 prints for each of these belts.

In summary, the seam heat stress release process of the present invention resolves seam cracking/delamination problems, provides a very short treatment processing cycle time, avoids seam area heat induced set problems, prevents the appearance of ripples in the imaging zones adjacent to the seam heat treatment area, produces a dimensionally stable imaging member belt, and very importantly, totally eliminates high seam protrusions to reduce seamed imaging member belt rejection rates thereby increasing belt production yield. These results demonstrate clear advantages of the process of this invention over those used by prior art seam heat treatment processes. Further, seam quality is so high that manual inspection steps may be eliminated.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. A process comprising providing a support having an elongated surface with an arcuate convex substantially semicircular cross section and having a predetermined radius of curvature, providing a flexible belt having parallel edges and a welded seam extending from one edge to the other edge, the belt seam comprising a seam region comprising an overlap and two adjacent splashings, polymer material having a glass transition temperature, an inner surface and an outer surface, supporting the inner surface of the seam on the elongated surface with the belt conforming to the predetermined convex radius of curvature, progressively elevating the temperature of localized sites on and along the seam from one edge of the belt to the other with heat energy to at least the glass transition temperature of the polymer material by directing a beam of heat energy at the localized sites, applying line compression pressure against the seam region by pressing a rotatable wheel having a peripheral surface with an arcuate concave cross section having a radius of curvature which matches or is slightly larger than the predetermined curvature of the arcuate convex substantially semicircular cross section of the elongated surface, simultaneously rolling and pressing a part of the peripheral surface of the wheel against the outer surface of the seam, to continuously generate lines of compressive contact over the seam region, from one edge of the belt to the other while the temperature of the localized sites pressed by the wheel is at least the glass transition temperature of the polymer material, the line of compressive contact at the peripheral surface of the wheel pressing against the outer surface of the seam being substantially parallel to the predetermined curvature of the elongated surface having an arcuate convex substantially semicircular cross section and in substantially line contact with the outer surface of the seam, and rapidly cooling the seam to a temperature below the glass transition temperature of the thermoplastic material while maintaining the belt in conformance with the predetermined arc of the elongated surface.

2. A process according to claim 1 wherein the predetermined radius of curvature of the convex semicircular cross section of the elongated surface is between about 9.5 millimeters and about 50 millimeters.

3. A process according to claim 2 wherein the inner surface of the seam on the elongated surface conforms to the predetermined radius of curvature with between about 10 degrees and about 180 degrees of wrap.

4. A process according to claim 1 wherein the peripheral surface of the rotatable wheel is heated during the simultaneously rolling and pressing of the peripheral surface of the wheel against the outer surface of the seam.

5. A process according to claim 1 wherein the localized sites having an average width of between about 3 millimeters and about 25 millimeters.

6. A process according to claim 1 wherein the arcuate concave cross section of the peripheral surface of the rotatable wheel has a radius of curvature of between about 9.5 millimeters and about 55 millimeters.

7. A process according to claim 6 wherein the rotatable wheel has a substantially hour glass shaped cross section with a central waist, the waist having a radius of between about ⅛ inch (3.2 mm) and about ½ inch (12.7 mm).

8. A process according to claim 1 wherein the arcuate concave cross section of the peripheral surface of the rotatable wheel has a radius of curvature that ranges from the same radius of curvature as the predetermined convex radius of curvature of the elongated surface to a radius of curvature about 10 percent larger than the predetermined radius of curvature of the elongated surface.

9. A process according to claim 1 wherein the flexible belt is an intermediate image transfer belt.

10. A process according to claim 1 wherein the flexible belt is an electrographic imaging member.

11. A process according to claim 1 wherein the flexible belt is an electrophotographic imaging member.

12. A process according to claim 10 wherein the electrophotographic imaging member comprises a charge generating layer and a charge transport layer comprising the thermoplastic polymer material.

13. A process according to claim 1 including producing the beam of heat energy with a carbon dioxide laser.

14. A process according to claim 1 including producing the beam of heat energy with a tungsten halogen quartz bulb focused with a reflector having a hemiellipsoid shape.

15. A process according to claim 1 wherein the localized sites have a circular shape.

16. A process according to claim 1 wherein the line contact of the concave surface of the rotatable wheel pressing against the outer surface of the seam is substantially immediately adjacent to the beam of heat energy while the temperature of the localized site is at at least the glass transition temperature of the thermoplastic polymer material.

* * * * *